United States Patent
Heitz et al.

(12)

(10) Patent No.: US 6,281,283 B1
(45) Date of Patent: Aug. 28, 2001

(54) METHOD FOR PRODUCING POLYALKYLENE ARYLATES

(75) Inventors: Thomas Heitz, Dannstadt-Schauernheim; Martin Klatt, Mannheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,719

(22) PCT Filed: Mar. 12, 1999

(86) PCT No.: PCT/EP99/01634

§ 371 Date: Sep. 7, 2000

§ 102(e) Date: Sep. 7, 2000

(87) PCT Pub. No.: WO99/48967

PCT Pub. Date: Sep. 30, 1999

(30) Foreign Application Priority Data

Mar. 21, 1998 (DE) .............................. 198 12 557

(51) Int. Cl.[7] .......................... C08G 63/78; C08L 67/02; C08K 3/34; C08K 5/09
(52) U.S. Cl. .......................... 524/601; 524/322; 524/444; 524/451; 528/274
(58) Field of Search ................................ 524/601, 451, 524/444, 322; 528/274, 283

(56) References Cited

U.S. PATENT DOCUMENTS

| 3,859,246 | * | 1/1975 | Jackson, Jr. et al. . |
| 4,448,913 | | 5/1984 | Coleman . |
| 4,699,942 | * | 10/1987 | Weaver et al. . |

FOREIGN PATENT DOCUMENTS

| 1 569 591 | 5/1969 | (DE) . |
| 30 31 491 | 4/1982 | (DE) . |
| 255 735 | 2/1988 | (EP) . |
| 1104089 | 9/1966 | (GB) . |
| 98/41559 | 9/1998 | (WO) . |

OTHER PUBLICATIONS

JP58/219255= Dewent Abst. 6/82.
JP62/275152= Dewent Abst. 11/87.

* cited by examiner

*Primary Examiner*—Tae H. Yoon
(74) *Attorney, Agent, or Firm*—Keil & Weinkauf

(57) ABSTRACT

A continuous process for the preparation of polyalkylene arylates A) containing lubricants and nucleating agents, in which an aromatic dicarboxylic acid or esters or ester-forming derivatives thereof are esterified or transesterified with a molar excess of an aliphatic dihydroxy compound and the (trans)esterification product obtained is polycondensed, wherein when at least 80% of the desired viscosity number has been reached, lubricants B) and nucleating agents C) are added to the polymer melt and the melt is optionally post-condensed and then discharged, cooled and granulated.

9 Claims, No Drawings

METHOD FOR PRODUCING POLYALKYLENE ARYLATES

DESCRIPTION

The invention relates to an improved process for the continuous preparation of polyalkylene arylates containing lubricants and nucleating agents.

Polyalkylene arylates are characterized by low water absorption and good dimensional stability and also good resistance to solvents.

A disadvantageous property thereof is the low velocity of crystallization, which gives problems when processing high-molecular or very thin-walled injection mouldings.

By the addition of a nucleating agent—optionally in combination with other additives—the velocity of crystallization can be improved, as is disclosed in EP-A 255,735, U.S. Pat. No. 4,448,913, JP-A 62/275152 and JP-A 58/219255.

Nucleated polyesters are prepared in the prior art by incorporating the additives in an extruder for example. This additional processing step is cost-intensive and also causes thermal damage to the polymer. As regards their mechanical properties, particularly multiaxial toughness and colour fastness (yellowing) of the known molding materials are unsatisfactory.

It is thus an object of the present invention to provide an improved continuous process for the preparation of polyalkylene arylates containing lubricants and nucleating agents, which produces polyesters having improved properties in a more economical manner and with extremely little thermal damage to the polymer. In particular, it is desired to improve their mechanical properties such as multiaxial toughness and their color constancy, better processing being achieved due to fast crystallization.

Surprisingly, we have found that this object can be achieved by esterifying or transesterifying an aromatic dicarboxylic acid or esters or ester-forming derivatives thereof with a molar excess of an aliphatic dihydroxy compound and polycondensing the (trans)esterification product obtained, wherein, when the viscosity number has reached at least 80% of the desired value, there are added lubricants B) and nucleating agents C) to the polymer melt and condensation of the melt is optionally continued, the melt then being discharged, cooled and granulated.

Preferred embodiments are disclosed in the sub-claims.

The component A) present in the molding compositions produced by the process of the present invention comprises from 95 to 99.9 wt %, preferably from 96 to 99.8 wt % and more preferably from 98 to 99.5 wt % of a thermoplastic polyalkylene arylate.

Such polyalkylene arylates are obtained by esterifying or transesterifying an aromatic dicarboxylic acid or esters or ester-forming derivatives thereof with a molar excess of an aliphatic dihydroxy compound and polycondensing the (trans)esterification product obtained in known manner.

Preferred dicarboxylic acids are 2,6-naphthalenedioic acid and terephthalic acid or mixtures thereof. Up to 30 mol %, preferably not more as 10 mol %, of the aromatic dicarboxylic acids can be replaced by aliphatic or cycloaliphatic dicarboxylic acids such as adipic acid, azelaic acid, sebacic acid, dodecanedioic acids and cyclohexanedioic acids.

The preferred aliphatic dihydroxy compounds are diols having from 2 to 6 carbon atoms, particularly ethane-1,2-diol, propane-1,3-diol, butane-1,4-diol, hexane-1,6-diol, hexane-1,4-diol, 2-methylpentane-1,5-diol, cyclohexane-1,4-diol, cyclohexane-1,4-dimethanol and neopentyl glycol or mixtures thereof.

Particularly preferred polyesters (A) are polyalkylene terephthalates derived from alkanediols containing from 2 to 10 carbon atom, preferably from 2 to 6 carbon atoms. Of these, polyethylene terephthalate and polybutylene terephthalate or mixtures thereof are particularly preferred.

Other preferred compounds are polyethylene terephthalates and polybutylene terephthalates containing up to 1 wt %, based on A), and preferably up to 0,75 wt %, of hexane-1,6-diol and/or 2-methylpentane-1,5-diol as additional monomer units.

Such polyalkylene terephthalates are known per se and are described in the literature. They contain an aromatic ring in the main chain, which comes from the aromatic dicarboxylic. The aromatic ring may also be substituted, eg by halogen such as chlorine and 45 bromine or by $C_1$–$C_4$ alkyl such as methyl, ethyl, isopropyl, n-propyl, n-butyl, isobutyl or tert-butyl.

In particular, preference is given to polyesters whose content of carboxylene end groups is up to 50 meq/kg, preferably up to 30 meq/kg and more preferably up to 27 meq/kg of polyester. Such polyesters can be prepared for example by the process of DE-A 4,401,055. The content of carboxylene end groups is usually determined by a titration method (eg potentiometry).

The preferred method of preparation is in accordance with DE-A 4,401,055 and is carried out continuously by a) esterifying or transesterifying, in a first step, an aromatic dicarboxylic acid or esters or ester-forming derivatives thereof with a molar excess of a dihydroxy compound, b) precondensing, in a second step, the (trans)esterification product obtained under a) and c) polycondensing, in a third step, the product obtained in b) to the desired viscosity number, step a) and step b) of the process being carried out in at least two temperature zones.

Step a) of the process is referred to as the "(trans) esterification reaction". This is carried out in at least two, preferably at least three temperature zones. The temperature in a succeeding zone should be 1–40° C., preferably 2–30° C. and more preferably 5–10° C. higher than the temperature of the preceding zone. The temperature range for the entire esterification reaction is generally (depending on the starting material) from 165° to 260° C., preferably from 1700 to 250° C. and more preferably from 1800 to 240° C., the pressure generally being from 1 to 10 bar, preferably from 1 to 4 bar and more preferably from 1 to 2 bar.

Preferably step a) of the process is carried out in at least two temperature zones under pressure conditions in the individual zones which are substantially identical. The industrial requirements in respect of for example equipment (eg in the form of cascades of boilers) for the creation of different temperature zones are known to the person skilled in the art, for which reason it is not necessary to mention further details here.

The starting materials, such as diols and acids, have already been described above (component A).

To effect conversion, use is usually made of a molar excess of diol in order to influence the ester balance to the desired degree. The molar ratios of dicarboxylic acid or alkyl dicarbonate to diol are usually from 1:1.1 to 1:3.5 and preferably from 1:1.2 to 1:2.2. Molar ratios of dicarboxylic acid to diol of from 1:1.5 to 1:2. or of diester to diol of from 1:1.2 to 1.5 are very much preferred.

Alternatively, the ester reaction can be carried out in the first zone using a lower excess of diol while further amounts of diol are fed to the other temperature zones. In the preferred embodiment of the process of the invention comprising three temperature zones the entire diol is distributed over 3 zones as follows (in percentages): 60 to 85 (1), 10 to 25 (2) and 5 to 15 (3), preferably 70 to 80 (1), 10 to 20 (2), 5 to 10 (3).

The residence times for the entire step a) are from 140 to 300 min, preferably from 150 to 260 min and more preferably from 160 to 220 min, the residence time in the first zone being from 100 to 190 min, preferably from 110 to 150 min and in the second zone from 65 to 140 min, preferably from 65 to 110 min. For the preferred embodiment comprising 3 zones the residence time in the third zone is from 15 to 45 min, preferably from 15 to 30 min, whilst the residence times in the second zone is reduced accordingly and in the first zone is retained as stated above.

In the preferred embodiment of the process of the invention the residence times decrease from the first zone to the third zone preferably in a ratio of 6:3:1.

In a particularly preferred embodiment of the process, there is added to the dihydroxy compound, prior to step a), first a catalyst and then an alkali metal compound or alkaline earth metal compound.

Preferred catalysts are titanium compounds and tin compounds such as are disclosed, for example, in U.S. Pat. Nos. 3,936,421 and 4,329,444. As preferred compounds there may be mentioned tetrabutyl orthotitanate and triisopropyl titate and also tin dioctoate, which are usually used in step a) in amounts of from 20 to 250 ppm, (based on metal).

To further reduce the content of carboxylene end groups in the polyester it may be advantageous to add, prior to the reaction of the starting monomers, from 0.1 to 10 mmol, preferably from 0.2 to 0.65 mmol, per kg of polyester, of an alkali metal compound or alkaline earth metal compound (calculated as alkali metal or alkaline-earth metal). Such compounds are proposed in DE-A 4,333,930. As preferred compounds there may be mentioned sodium carbonate, sodium acetate, and sodium alkoxides, particularly sodium methoxide.

The (trans)esterification products are then fed continuously to the precondensation stage b).

This has at least two, preferably at least three and more preferably at least four temperature zones. The temperature in each succeeding zone is in this case from 1 to 400C, preferably from 2 to 30° C. and more preferably from 5 to 20° C. higher than the temperature in the preceding zone. The temperature range for the entire precondensation stage is generally (depending on the starting materials) from 220 to 300° C., preferably from 225 to 290° C. and more preferably from 240° to 290° C.

The precondensation is preferably carried out using a pressure in the first zone of from 0.5 to 1 bar, preferably from 0.6 to 0.8 bar and in the second or last zone a pressure of from 20 to 200, preferably from 25 to 150 mbar and more preferably from 50 to 150 mbar. In an industrial plant this may be achieved by the use of eg a vertical multitube fixed-bed reactor, other reactors for carrying out the process being known to the person skilled in the art.

The residence times for the entire step b) of the process are from 10 to 80 min, preferably from 15 to 50 min and more preferably from 20 to 40 min.

In a particularly preferred embodiment of the process of the invention there are used four temperature zones, the temperature rising from zone to zone in the ratios stated above, whilst the pressure is reduced from the first to the fourth zone within the limits defined above. In the case of this preferred embodiment of the shell-and-tube heat exchanger, the fourth zone consists of a contrivance for the separation of liquid and vapor phases (also known as a vapor separator), the ratio of the volume of the separating vessel to the volume in the tubes being preferably from 5:1 to 15:1, particularly from 8:1 to 13:1.

The ratios by volume of the first three zones in this particularly preferred embodiment are such that the first zone constitutes from 30 to 60%, preferably 50%, the second zone constitutes from 20 to 40%, preferably 30%, and the third zone, constitutes from 10 to 30%, preferably 20%, of the total volume (ratios by volume). The temperature ranges, pressure ranges and residence times for the particularly preferred embodiment of the process of the invention are given below:

1st zone: temperature from 230° to 270° C., preferably from 240° to 250° C., pressure from 0.6 to 0.9 bar, preferably from 0.7 to 0.9 bar.

Residence time from 10 to 30 min, preferably from 15 to 25 min.

2nd zone: temperature from 240° to 280° C., preferably from 250° to 270° C., pressure from 0.2 to 0.6 bar, preferably from 0.3 to 0.5 bar.

Residence time from 5 to 25 min, preferably from 7 to 15 min.

3rd zone: temperature from 245° to 290° C. preferably from 250° to 280° C., pressure from 0.1 to 0.3 bar, preferably from 0.1 to 0.25 bar.

Residence time from 5 to 10 min, preferably from 4 to 8 min.

4th zone: temperature from 250° to 300° C. preferably from 252° to 285° C., pressure from 0.015 to 0.2 bar, preferably from 0.025 to 0.15 bar.

Residence time from 10 to 30 min, preferably from 14 to 24 min.

The catalysts and other additives stated above for step a) of the process can be metered to step b) of the process in the amounts stated.

Following step b) of the process of the invention the polyester prepolymer has a viscosity number of from 15 to 50 mL/g and preferably from 20 to 30 mL/g, measured on a 0.5 wt % solution in phenol/o-dichlorobenzene (1:1) according to DIN 53,728, part 3 (1985) at 25° C.

The polyester prepolymer is then passed to step c) of the process of the invention. This is preferably carried out in a single-stage at temperatures of from 240° to 290° C., preferably from 240° to 270° C. and more preferably from 240° to 265° C. The pressure is 45 from 0.3 to 10 mbar, preferably from 0.3 to 5 mbar and mor prefably from 0.3 to 2 mbar.

The residence times are usually from 30 to 180 min, preferably from 35 to 150 min.

During polycondensation, surface renewal may be carried out. By surface renewal we mean that fresh polymer constantly reaches the surface of the melt so as to facilitate the emission of diol.

This is preferably 1 to 20 and in particular from 1.5 to 6 $m^2$/kg of product per minute.

It may also be advantageous to add catalysts and other additives, such as those described above, to this step of the process also.

On termination of the continuous polycondensation the polyester has a viscosity number of from 60 to 180 mL/g, preferably from 90 to 160 mL/g, determined on a 0.5 wt % strength solution in a phenol/o-dichlorobenzene mixture (ratio by weight 1:1) at 25° C. according to DIN 53,728, Part 3 (1985).

An essential feature of the process of the invention is that when at least 80%, preferably at least 95% and more preferably 100%, of the desired end viscosity number of the polyester has been reached, lubricants B) and nucleating agents C) are together added to the polymer melt, after which the melt is optionally post-condensed and then discharged, cooled and granulated. Preferably the lubricant B) is added in a quantity of from 0.01 to 3, preferably from 0.1 to 1 and particularly from 0.2 to 0.8 wt % and the nucleating agent C) in a quantity of from 0.001 to 2, preferably from 0.01 to 1 and particularly from 0.03 to 0.5 wt %, based on 100 wt % of the components A) to C).

It is particularly preferred to effect the addition in the form of a suspension, the nucleating agent being suspended in the lubricant, optionally at elevated temperature, prior to addition to the melt. Depending on the lubricant used it may be necessary, when making a suspension, to heat the mixture of lubricant and nucleating agent previously to a temperature of from 30° to 150° C., preferably from 60° to 130° C. and then add it to the polymer melt.

As examples thereof there may be mentioned low-molecular polyethylene waxes, which exist, as is well known, in the solid state at room temperature and have to be heated to create a suspension thereof in the nucleating agent.

The addition of the components B) and C) preferably takes place during polycondensation when at least 80% the desired end viscosity number has been reached. Suitable polykondensation equipment is known to the person skilled in the art, for which reason it is not necessary to give further details here. In a particularly preferred embodiment of the process of the invention the melt can be removed from the polykondensation reactor, and the mixture of B) and C) can then be added via suitable means, eg a metering pump with heating, and the polymer melt can then be passed to, say, a brine-cooled tube, where it is condensed to the desired end viscosity number with homogenization of the melt, after which it is cooled and granulated.

Suitable lubricants B) are low-molecular weight polyethylene waxes, which preferably contain functional groups such as glycidyl and/or carboxyl groups and have an average molecular weight Mn (number average) of from 500 to 20,000 g/mol, preferably from 1,000 to 5,000 g/mol, more preferably from 1,000 to 5,000 g/mol and most preferably from 1,000 to 3,000 g/mol. The molecular weight is usually determined by gel permeation chromatography (GPC) using LDPE as standard. The melt viscosity is preferably from 10 to 10,000 and more preferably from 100 to 5,000 mm$^2$/g, very preferably from 100 to 3,000 mm$^2$/g and most preferably from 100 to 2,000 mm$^2$/g (according to DIN 51,562) at a temperature of 120° C.

The polyethylenes containing acid groups or epoxide rings may be copolymers of ethylene with α,β-unsaturated acid compounds or epoxide compounds they may be polyethylenes to which the acid compound or epoxide compound has been grafted.

The polyethylenes can be prepared by a high-pressure, medium-pressure or low-pressure process. Use may be made of both polyethylenes of high mass density (HDPE) (in the range of from 0.94 to 0.97 g/cm$^3$), preferably produced by the so-called Phillips process (medium-pressure process), and polyethylenes of low mass density (LDPE) (in the range of from 0.91 to 0.94 g/cm$^3$), particularly linear polyethylenes of low mass density, preferably produced by the vapor-phase process.

Processes for the preparation of such copolymers are known to the person skilled in the art (eg Ullmanns Enzyklopaedie der Technischen Chemie, 4th Edition, Vol. 19, pages 169 to 175).

Suitable products are commercially available under the trademarks Luwax® (BASF AG), Hoechstwachs® PED 191 or H12 (Hoechst AG) and 45 also Poligen® EAS-1 (BASF AG).

Other lubricants are esters or amides of saturated or unsaturated aliphatic carboxylic acids containing from 10 to 40 and preferably from 16 to 22 carbon atoms with aliphatic saturated alcohols or amines containing from 2 to 40 and preferably from 2 to 6 carbon atoms.

The carboxylic acids may be monobasic or dibasic. As examples thereof there may be mentioned nonanoic acid, palmitic acid, lauric acid, margaric acid, dodecanedioic acid, docosanoic acid and more preferably stearic acid, capric acid and also montanic acid (mixture of fatty acids containing from 30 to 40 carbon atoms).

The aliphatic alcohols can be monohydric to tetrahydric, where not all of the hydroxyl groups need to be be esterified. Examples of such alcohols are n-butanol, n-octanol, stearyl alcohol, ethylene glycol, propylene glycol, neopentyl glycol, pentaerythritol, whilst glycerol and pentaerythritol are preferred.

The aliphatic amines can be mono- to tri-functional. Examples thereof are stearylamine, ethylenediamine, propane-6-diamine, hexamethylenediamine, di(6-aminohexyl)amine, of which ethylenediamine and hexamethylenediamine are particularly preferred. Preferred esters or amides are thus glycerol distearate, ethylendiamine distearate, glycerol monopalmitate, glycerol trilaurate, glycerol monobehenate and pentaerythritol tetrastearate.

Alternatively, mixtures of different esters or amides or esters in admixture with amides may be used, the mixing ratio being arbitrary.

Particularly suitable nucleating agents C) are minerals selected from the group comprising alkali metal and/or alkaline earth metal (alumo)silicates and preferably selected from the group comprising island silicates or lamellar silicates.

Use can be made of all possible compounds such as hydroxides, carbonates, hydroxycarbonates, sulphates, silicates and also phosphates and phosphonates.

In particular, magnesium silicates in various proportions are suitable, talcum being preferred.

Typical compositions of talcum powder can usually be determined by elementary analysis and contain, as the main constituents, $SiO_2$, $MgO$, $Al_2O_3$, $Fe_2O_3$, $CaO$ (following pyrolysis)

A particularly preferred nucleating agent C) is talcum preferably having a particle size (dgo value) of less than 150 μm, preferably less than 100 μm and more preferably less than 50 μm.

As examples of other suitable nucleating agents there may be mentioned alkali metal salts or alkaline earth metal salts of organic or inorganic acids such as sodium antimonate, calcium stearate, sodium terephthalate, lime citrate and also metal acids (basic acids) of titanium or tungsten.

Suitable derivatives of inorganic acids are preferably phosphoric derivatives, of which sodium phenyl phosphinate, zinc phosphate, calcium bis-3,5-di-tert-butylethylphosphonate (Irganox® 1425 available from Ciba Geigy AG) and also tetrakis(2,4-di-tert-butylphenyl)-4,4'-biphenylene diphosphonite) are particularly preferred.

The polyesters which can be produced by the above process show improved mechanical properties, particularly multiaxial toughness, and reduced yellowing and are easier to process, since the rate of crystallizeationis considerably increased.

EXAMPLES

Example 1

881.8 g of DMT and 563.7 g of butane-1,4-diol were continuously fed to a reaction zone. Before the butane diol was brought into contact with the DMT, it was admixed with 781.8 mg of tetrabutyl orthotitanate and 99 microliters of a 30 wt % solution of NaOCH$_3$ in methanol.

The temperature in the first reaction zone was 185° C. at a pressure of 1 bar and an average residence time of 182 min.

The temperature in the second reaction zone was 205° C. at a pressure of 1 bar and an average residence time of 63 min.

The temperature in the third reaction zone was 210° C. at a pressure of 1 bar and an average residence time of 40 min.

The resulting distillates, which contained BDO, DMT, THF and water, were separated in a column system, with DMT and BDO being recycled to the reaction. At a conversion rate of 93%, the transesterification product was fed to a vertical tube which was subdivided into four heating zones.

The temperature in the fourth reaction zone was 247° C. at a pressure of 700 mbar and an average residence time of 22 min.

The temperature in the fifth reaction zone was 252° C. at a pressure of 400 mbar and an average residence time of 11 min.

The temperature in the sixth reaction zone was 255° C. at a pressure of 150 mbar and an average residence time of 5 min.

The temperature in the seventh reaction zone was 256° C. at a pressure of 30 mbar and an average residence time of 18 min.

The excess BDO and the reaction products such as THF and water were separated at the top of the reaction tube. The pecondensate was passed without further addition of catalyst to a polykondensation reactor (zone 8).

The temperature in the eighth reaction zone was 257° C. at a pressure of 0.4 mbar, an average residence time of 115 min and a surface renewal of 4 m$^2$/h·kg of PBT.

On leaving the eighth reaction zone there was added to the melt (temperature 257° C.: 100% of the end viscosity number) a suspension of 0.46 g of talcum powder in 4.6 g of a molten pentaaerythritol stearate at 90° C. in a continuous manner, and the mixture was homogenized with a static mixer.

The product obtained possessed a viscosity number of 130 and a CEG of 21 meq/kg, a degree of yellow coloration of dB 1.3 against the whiteness standard, a crystallization maximum of 189° C. and a half-width of the crystallization isotherm of 5° C.

Example 2

694.1 g of TPA and 790.7 g of butane-1,4-diol were continuously fed to a reaction zone. Before the butane diol was brought into contact with the DMT, it was admixed with 313.9 mg of tetrabutyl orthotitanate and 114 microliters of a 30 wt % solution of NaOCH$_3$ in methanol.

The temperature in the first reaction zone was 220° C. at a pressure of 1 bar and an average residence time of 182 min.

The temperature in the second reaction zone was 222° C. at a pressure of 1 bar and an average residence time of 65 min.

The temperature in the third reaction zone was 224° C. at a pressure of 1 bar and an average residence time of 41 min.

A stream of 470.8 mg of tetrabutyl orthotitanate in the form of a 60 wt % strength solution in BDO was continuously mixed with the material in the third reaction zone.

The resulting distillates, which contained BDO, THF and water, were separated in a column system, with BDO being recycled to the reaction. At a conversion rate of 94%, the transesterification product was fed to a vertical tube which was subdivided into four heating zones.

The temperature in the fourth reaction zone was 246° C. at a pressure of 700 mbar and an average residence time of 22 min.

The temperature in the fifth reaction zone was 250° C. at a pressure of 400 mbar and an average residence time of 12 min.

The temperature in the sixth reaction zone was 255° C. at a pressure of 150 mbar and an average residence time of 5 min.

The temperature in the seventh reaction zone was 258° C. at a pressure of 30 mbar and an average residence time of 18 min.

The excess BDO and the reaction products such as THF and water were separated at the top of the reaction tube and subjected to further processing. The pecondensate was passed without further addition of catalyst to a polykondensation reactor (zone 8).

The temperature in the eight reaction zone was 256° C. at a pressure of 0.4 mbar, an average residence time of 117 min and a surface renewal of 4 m$^2$/h·kg of PBT.

On leaving the eighth reaction zone there was added to the melt (temperature 256° C.: 100% of the end viscosity number) a suspension of 0.46 g of talcum powder in 4.6 g of a molten pentaaerythritol stearate at 90° C. in a continuous manner, and the mixture was homogenized with a static mixer.

The product obtained possessed a viscosity number of 132 and a CEG of 18 meq/kg, a degree of yellowness of dB 1.2 against the whiteness standard, a crystallization maximum of 188° C. and a half-width of the crystallization isotherm of 4.9° C.

Comparative Example A

The experiment described in Example 1 was repeated except that the melt of polymer leaving the eighth reaction zone was immediately granulated.

The granulate was compounded with the corresponding quantity of the ester and the mineral (as described in the examples) in a twin-worm kneader ZSK 25 at 250° C. The components were drum-coated onto the granulate prior to compounding.

The granulate obtained possessed a viscosity number of 123 and a CEG of 31 meq/kg, a degree of yellow coloration of dB 2.0 against the whiteness standard and a half-width of the crystallization isotherm of 5.2° C.

Fabrication to Molded Articles

The products obtained in Examples 1 and 2 and Comparative Example A were processed by injection molding to produce the shaped articles required for the tenacity tests. The mass temperature was 260° C.

| Product from experiment No. | 1 | 2 | Comp. Ex. A |
| --- | --- | --- | --- |
| Viscosity number in solution VN [ml/g] | 130 | 132 | 123 |
| VN of shaped articles | 128 | 129 | 121 |
| CEG (meq/kg) of granulate | 21 | 18 | 31 |
| CEG (meq/kg) of shaped articles | 23 | 22 | 33 |
| Yellowness Index | 9.9 | 11.1 | 11.3 |

-continued

| Product from experiment No. | 1 | 2 | Comp. Ex. A |
|---|---|---|---|
| Temperature of maximum crystallization | 189 | 188 | 186 |
| Half-width of the crystallization peaks | 5.0 | 4.9 | 5.4 |
| Impact resistance [kJ/m$^2$] ISO 179 | >250 | >250 | 250[a] |
| Multiaxial toughness [Nm] ISO 6603-2 | 35.8 | 34.5 | 30.8 |
| Yellowness YI after exposure | 45.2 | 48.6 | 56.7 |

[a]of 10 specimens, 2 rods fractured

The viscosity number was measured at 25° C. on a 0.5% solution of the polymer in a 1:1 mixture of phenol/o-dichlorobenzene.

Crystallization was measured by means of DSC after melting once to 250° C. and allowing to cool at a rate of 20° C/min. The half-width was determined as the width of the crstallization peak (in° C.) measured halfway between the baseline and peak maximum (apex).

The carboxyl end groups (CEG) were determined by potentiometric titration of the acetic acid liberated when a sample of the polymer dissolved in nitrobenzene was caused to react with a defined excess of potassium acetate.

Exposure of the injection molded disc to light was carried out as specified in DIN 53,387 by exposure to light having an wattage of 60 W/m$^2$ and a wavelength of from 290 to 400 nm using a UV radiator (Heraeus X1200 CPS) over a period of 2,000 h.

The degree of discoloration of the exposed disc was measured as specified in DIN 5033 and compared with an unexposed sample. The standard light D65 reflected at an angle of 100 was measured. The reading stated is the yellowness index YI=(131.84·X-116·46·z)/Y.

The impact strength was measured by the Charpy impact resistance test as specified in ISO 179 on a test piece leU at 23° C.

The multiaxial toughness was measured using the penetration test specified in ISO 6603-2 on a disc measuring 60 mm×2 mm at 23° C.

What is claimed is:

1. A continuous process for the preparation of polyalkylene arylates A) containing lubricants and nucleating agents, in which an aromatic dicarboxylic acid or an ester or ester-forming derivative thereof is esterified or transesterified in at least two temperature stages with a molar excess of an aliphatic dihydroxy compound and the (trans) esterification product obtained is polycondensed, wherein when at least 80% of the desired viscosity number has been reached, a lubricant B) and nucleating agent C) are added to the polymer melt and the melt is optionally post-condensed and then discharged, cooled and granulated.

2. A process as defined in claim 1, wherein the lubricant B) is added in a quantity of from 0.01 to 3 wt % and the nucleating agent C) in a quantity of from 0.001 to 2 wt %, based on 100 wt % of the components A) to C).

3. A process as defined in claim 1, wherein the nucleating agent is suspended in the lubricant prior to addition to the melt optionally at elevated temperature.

4. A process as defined in claim 3, wherein the suspension is created at temperatures of from 30° to 150° C. and then added to the polymer melt.

5. A process as defined in claim 1, wherein a polyalkylene terephthalate is used.

6. A process as defined in claim 1, wherein the nucleating agent used is a mineral selected from the group consisting of alkali metal or alkaline earth metal (alumo)silicates or a mixture thereof.

7. A process as defined in claim 1, wherein talcum is used as the nucleating agent.

8. A process as defined in claim 1, wherein the lubricant used is an ester or amide of a carboxylic acid containing from 10 to 40 carbon atoms or a mixture thereof.

9. A process as defined in claim 1, wherein the lubricant used is pentaerythritol tetrastearate.

* * * * *

UNITED STATES PATENT AND TRADEMARK OFFICE
CERTIFICATE OF CORRECTION

PATENT NO. : 6,281,283 B1
DATED : August 28, 2001
INVENTOR(S) : Heitz et al.

It is certified that error appears in the above-identified patent and that said Letters Patent is hereby corrected as shown below:

<u>Column 10, claim 6,</u>
Line 30, "or a" should be -- and a --.

Signed and Sealed this

Second Day of April, 2002

Attest:

JAMES E. ROGAN
*Attesting Officer*  *Director of the United States Patent and Trademark Office*